(No Model.) 2 Sheets—Sheet 1.

L. WELDON.
APPARATUS FOR DYEING.

No. 501,856. Patented July 18, 1893.

WITNESSES:
C. L. Bendixen
J. J. Laass

INVENTOR:
Leonard Weldon
By Duell, Laass & Duell
his ATTORNEYS.

(No Model.)

2 Sheets—Sheet 2.

L. WELDON.
APPARATUS FOR DYEING.

No. 501,856.

Patented July 18, 1893.

UNITED STATES PATENT OFFICE.

LEONARD WELDON, OF AMSTERDAM, NEW YORK, ASSIGNOR TO THE KLAUDER-WELDON DYEING MACHINE COMPANY, OF SAME PLACE.

APPARATUS FOR DYEING.

SPECIFICATION forming part of Letters Patent No. 501,856, dated July 18, 1893.

Application filed March 9, 1893. Serial No. 465,264. (No model.)

*To all whom it may concern:*

Be it known that I, LEONARD WELDON, of Amsterdam, in the county of Montgomery, in the State of New York, have invented new and useful Improvements in Dyeing-Machines, of which the following, taken in connection with the accompanying drawings, is a full, clear, and exact description.

This invention relates to the class of dyeing machines in which a rotary cage is arranged on a horizontal axis and with its lower portion in the vat containing the dye-liquor.

The object of my present invention is to provide the cage with simple, inexpensive and effective means for carrying the articles under treatment near the periphery of the cage during the greater portion of its revolution and thus expose said articles to the air during a longer period and render the machine more efficient in its operation. And to that end the invention consists essentially in the combination, with the vat and horizontally revolving cage arranged with its lower portion in said vat, of partitions extending from the periphery of the cage inward, and racks projecting from the lifting sides of the partitions as hereinafter more fully described and specifically set forth in the claims.

Figure 1:
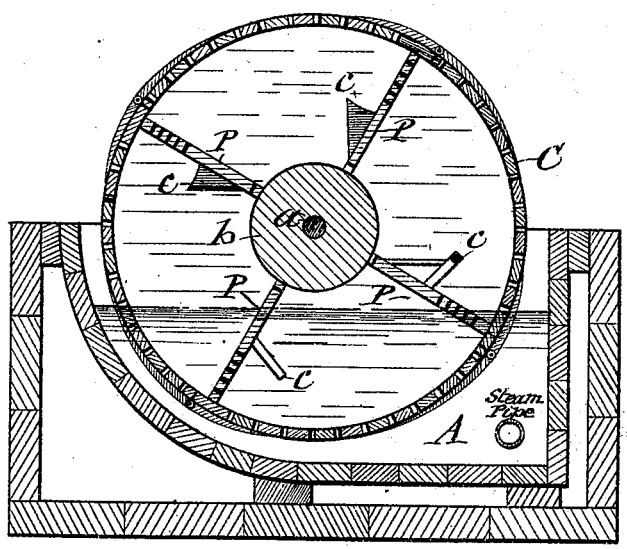
Figure 2:
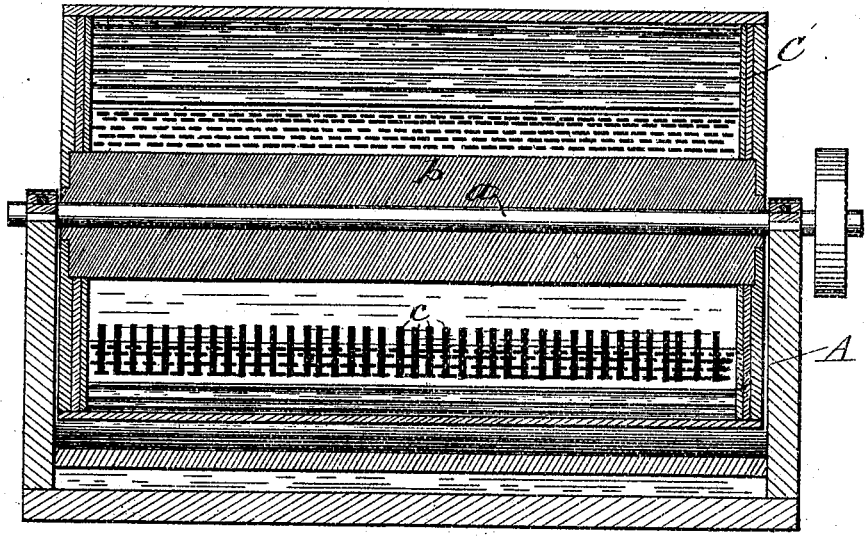
Figure 4:
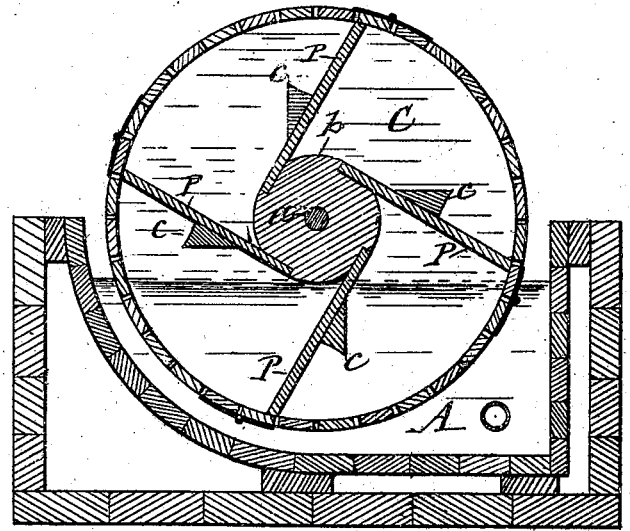

In the annexed drawings Figure 1 is a vertical transverse section of a dyeing machine embodying my invention. Fig. 2 is a vertical longitudinal section of the same. Fig. 3 is an end view of the machine, and Fig. 4 is a vertical transverse section of a modification of my invention.

Similar letters of reference indicate corresponding parts.

A— represents the dye-liquor vat constructed in any suitable manner to accommodate the lower half of the cage —C— which is disposed axially horizontal and journaled in suitable bearings secured to the top of opposite ends of the vat.

I preferably extend the shaft —a— through the cage and inclose said shaft in a large wooden roller —b—. The periphery of the cage is formed of longitudinal slats set slightly apart or otherwise formed of either partly or wholly open-work to allow the dye-liquor to freely pass through the cage. The interior of said cage is divided into compartments by partitions —P—P— extending from the periphery of the cage inward to the roller —b— either radially as shown in Fig. 1 of the drawings or obliquely as represented in Fig. 4 of the drawings. These partitions are perforated and to the lifting side of each I attach a suitable rack or shelf —c— located about midway between the periphery of the cage and roller —b— or in such position as to retain the articles under treatment in the peripheral portion of the cage nearly or quite during the entire revolution of the cage.

The rack —c— may consist either of a bar, or a board, or pins or any other suitable structure projecting from the partition and preferably inclined with the free edge or free ends toward the periphery of the cage to obtain an efficient hold on the articles in process of being dyed. Each of the compartments is provided with a suitable door for the introduction of the articles to be dyed.

What I claim as my invention is—

1. In combination with the vat and the horizontal revolving cage arranged with its lower portion in said vat, partitions extending from the periphery of the cage inward, and racks projecting from the lifting sides of the partitions as and for the purpose set forth.

2. In combination with the vat, a horizontal roller pivoted to opposite ends of the vat, a cage surrounding the roller, partitions extending from the periphery of the cage to the roller, and racks projecting from the lifting sides of the partitions as set forth.

In testimony whereof I have hereunto signed my name this 23d day of January, 1893.

LEONARD WELDON. [L. S.]

Witnesses:
H. M. SEAMANS,
J. J. LAASS.